United States Patent [19]
Inaba et al.

[11] Patent Number: 5,363,190
[45] Date of Patent: Nov. 8, 1994

[54] METHOD AND APPARATUS FOR OPTICAL MICRO MANIPULATION

[75] Inventors: Humio Inaba; Shunichi Sato, both of Sendai; Susumu Kikuchi, Tokyo, all of Japan

[73] Assignee: Olympus Optical Co., Ltd., Tokyo, Japan

[21] Appl. No.: 116,663

[22] Filed: Sep. 3, 1993

[30] Foreign Application Priority Data

Sep. 7, 1992 [JP] Japan .................................. 4-238571

[51] Int. Cl.$^5$ .......................................... G01N 21/47
[52] U.S. Cl. .................................... 356/337; 250/251
[58] Field of Search ............... 356/335, 336, 337, 338; 250/251

[56] References Cited

U.S. PATENT DOCUMENTS

| | | | |
|---|---|---|---|
| 3,808,550 | 4/1974 | Ashkin | 331/94.5 |
| 4,092,535 | 5/1978 | Ashkin et al. | 250/251 |
| 5,170,890 | 12/1992 | Wilson et al. | 250/251 |
| 5,198,369 | 3/1993 | Itoh et al. | 356/337 |

OTHER PUBLICATIONS

Ashkin et al "Observation of Light Scattering from Nonspherical Particles Using Optical Levitation", *Applied Optics*, vol. 19, No. 5, (1 Mar. 1980) pp. 660–668.

*Primary Examiner*—Richard A. Rosenberger
*Attorney, Agent, or Firm*—Frishauf, Holtz, Goodman & Woodward

[57] ABSTRACT

A microscopic specimen such as a cell organelle or a tissue cell generally has a non-rotational symmetrical refractive index distribution. Converging onto the microscopic specimen a laser beam with a non-rotational symmetrical intensity distribution (an elliptical pattern) traps the specimen, with the direction of the major axis of the specimen aligned with the direction of the major axis of the elliptical pattern of the laser beam. This is because the laser beam with the non-rotational symmetrical refractive index distribution has a non-rotational symmetrical trapping force, and hence can trap the specimen with non-rotational symmetrical refractive index distribution in a dynamically reliable manner. Thus, rotation of the major axis of the intensity distribution of the laser beam causes rotation of the trapped specimen.

17 Claims, 6 Drawing Sheets

METHOD AND APPARATUS FOR OPTICAL MICRO MANIPULATION

BACKGROUND OF THE INVENTION

1. Field of the Invention

This invention relates to micro manipulation, and more particularly to a method for optically micro-manipulating a microscopic specimen, such as a tissue cell, a cell organelle or the like, without mechanically touching the specimen, and also to an optical micro-manipulator for realizing the method.

2. Description of the Related Art

It is difficult to forming an image of a microscopic specimen viewed in a desired direction, by the use of a general optical microscope, since the microscope has various limitations in optical design.

In the case of an optical microscope of a general structure, a microscopic specimen is placed on a mechanical stage located perpendicular to the optical axis of the microscope, and an image of the microscopic specimen is formed on a surface parallel with the stage.

This microscope has rough and fine mechanical-stage controls and rough and fine focus-adjustments.

The mechanical-stage controls can move the mechanical stage in a horizontal plane (X-Y plane) perpendicular to the optical axis (Z-axis) of an objective lens, to thereby set within the field of view a desired portion of a microscopic specimen in the X-Y plane.

The focus adjustments move the mechanical stage in a direction of the optical axis so as to obtain a good focal point. Thus, these adjustments cannot be used, in a usual manner of use, to microscopically examine a microscopic specimen in a plane parallel with the optical axis (i.e., an X-z plane or a Y-Z plane).

A microscopic specimen such as a cell organelle, which is immersed in a liquid medium, typically, a physiological salt solution, is microscopically examined, while fixed with a cover glass on a slide glass. Accordingly, the specimen can be microscopically examined only from above the cover glass. Once fixed, the specimen is hard to microscopically examine in another direction.

There is a known mechanical micro-manipulator for micro-manipulating a specimen under a microscope so as to permit the specimen to be microscopically examined in a desired direction.

This micro-manipulator is used in combination with such a mechanical stage for a microscope as is described above, and has a tool for micro-manipulation, such as a microscopic probe or a hold pipette, which is movably placed on the mechanical stage.

A liquid medium in which a microscopic specimen is soaked is placed on the mechanical stage at the tips of the manipulation tool.

The hold pipette consists of a hollow tube member of a small diameter made of, e.g., glass. A fine pressure regulator, which is connected to the hold pipette, sucks the liquid medium contained in the hold pipette to enable the tip of the pipette to trap the specimen.

The manipulation tool can be moved in the directions of the X-, Y- and Z-axes by hydraulic control or electric control with the use of a remote controller.

The remote controller has manually-operated elements such as a joystick, a push button, etc. The observer can slightly move the manipulation tool in a desired one of the X-, Y- and Z-axis directions, by manually operating the remote controller, so as to set the tool in a desired position. As a result, the specimen can be micro-manipulated on the mechanical stage.

In order to perform desired fine movement of the manipulation tool, however, it is necessary to accurately operate the manual elements of the remote controller, and a skilled technique is required for the accurate operation. Actually, such a skilled technique is hard to obtain.

Further, when a hard manipulation tool mechanically manipulates such a soft microscopic specimen as a cell organelle, it can easily deform or damage the specimen.

In summary, it is very difficult to permit a specimen to be microscopically examined in a desired direction, with the use of a general microscope. In order to overcome this difficulty, it is not preferable to use the above-described conventional mechanical micro-manipulator, since the specimen may be adversely affected by mechanical contact, as well as the operational difficulty of the manipulator.

SUMMARY OF THE INVENTION

It is the object of the invention to provide an apparatus and a method, which are capable of optically micro-manipulating a microscopic specimen easily and without mechanically touching it, thereby permitting the specimen to be microscopically examined under a microscope in a desired direction without being adversely affected.

According to an aspect of the invention, there is provided a method for optically micro-manipulating a specimen immersed in a liquid.

This method comprises the steps of:
generating a laser beam having a non-rotational symmetrical spatial property distribution;
converging the laser beam onto the immersed specimen to trap it;
controlling the spatial property distribution of the laser beam by rotating the laser beam; and
microscopically observing the specimen by means of a microscope.

Preferably, the method further comprises the steps of observing the specimen by the use of an optical system for radiating the laser beam onto the immersed specimen, and positioning the laser beam to the laser beam is emitted onto the specimen to trap it.

According to another aspect of the invention, there is provided an optical micro-manipulator.

This manipulator comprises:
means for generating a laser beam having a non-rotational symmetrical spatial property distribution;
means for converging the laser beam onto the specimen to trap it; and
means for rotating the laser beam about an optical axis thereof to control the spatial property distribution thereof.

According to an embodiment of the invention, the laser beam generating means has a light source; means for converting a light beam, emitted from the light source, into a parallel light beam; and a filter located across the parallel light and having a non-rotational symmetrical aperture; and
the rotating means rotates the filter about the optical axis of the parallel light beam.

According to an embodiment of the invention, the laser beam generating means has a laser source provided with a Fabry-Pérot resonator; and a filter located in the resonator and having a non-rotational symmetrical aperture; and the rotating means rotates the filter about the optical axis of a light beam passing in the resonator.

Alternatively, the laser beam generating means may has a laser source for emitting a linerly-Polarized light beam.

Preferably, the non-rotational symmetrical aperture is a rectangular aperture.

The rotating means may has two $\lambda/4$ wave plates located across the light beam emitted from the laser source, and rotates about the axis of the light beam that one of the $\lambda/4$ wave plates which is located downstream of the other one in the direction of the light beam.

Alternatively, the rotating means may has a $\lambda/2$ wave plate located across the light beam emitted from the laser source, and rotates the $\lambda/2$ wave plate about the axis of the light beam.

An optical micro-manipulator according to a further aspect of the invention is used in combination with a microscopical observation means for microscopically examining a specimen immersed in a liquid.

This manipulator comprises:
a container containing the liquid in which the specimen is immersed;
means for microscopically observing the sample;
means for generating a laser beam having a non-rotational symmetrical spatial property distribution;
means for converging the laser beam onto the specimen to trap it; and
means for rotating the laser beam to control the spatial property distribution thereof.

According to an embodiment of the invention, the converging means emits the laser beam into the container in a horizontal direction, and the microscopical observation means permits the specimen to be observed from above the container.

In this case, the converging means converges two laser beams irradiated in opposite directions to each other, on the specimen.

Alternatively, the converging means emits the laser beam from under the container, and the microscopic observation means permits the specimen to be observed in a horizontal direction for the container.

Preferably, the manipulator further comprises:
first image pick-up means for picking up an optical image of the specimen formed by the converging means;
second image pick-up means for picking up an optical image from the microscopic observation means: and
means for selectively displaying the optical images picked by the first and second image pick-up means.

Alternatively, the manipulator further comprises means for moving the container along a direction of the optical axis of the microscopic observation means or the converging means.

Within the scope of the invention, the term "optical micro-manipulation" referred to above should be understood as meaning at least to rotate a specimen by means of a laser beam without mechanically touching it. Similarly, the term "optical micro-manipulator" should be understood as meaning an apparatus for performing the "optical micro-manipulation". However, the optical micro-manipulator of the invention can perform various operations such as moving, trapping, and holding the specimen, as well as rotating the same, by means of a laser beam without mechanically touching the specimen.

Further, within the scope of the invention, a figure of "rotational symmetry" referred to above should be understood as meaning a figure whose properties do not change even when the figure is rotated about a predetermined axis through a desired angle. Accordingly, an ellipse or similar figures are not included in the "rotational symmetrical" figure.

The optical micro-manipulation of the invention is based on an optical trapping technique for trapping a microscopic specimen by the use of a laser beam.

The optical trapping technique will be explained. When the direction in which a light beam advances has been changed as a result of reflection or refraction at the boundary between materials of different optical properties, a force corresponding to a change in light amount, i.e., optical pressure, occurs since the light beam has a momentum. Although the absolute value of this optical pressure is extremely low, high optical energy can be locally concentrated by converging a laser beam of high spatial coherence, thereby causing optical pressure capable of trapping a microscopic specimen.

Then, the optical properties of a microscopic specimen will be explained. A microscopic specimen such as a cell organelle generally has an aeolotropic refractive index distribution.

According to the invention, in view of the above optical properties of a microscopic specimen, the spatial property distribution of the laser beam for optical trapping is converted to have non-rotational symmetry. Accordingly, the trapping force of the laser beam has aeolotropic properties, too. Thus, the laser beam can trap a specimen, which has aeolotropic properties as described above, in a dynamically reliable manner, and the angular position of the specimen can be adjusted by rotating the spatial property distribution of the laser beam together with the specimen.

The optical manipulation method of the invention is hard to apply to a microscopic specimen having a rotational symmetrical refractive index distribution or reflectance distribution. Actually, however, it is highly possible that cell organelles, for example, have aeolotropic properties in refractive index or reflectance distribution because of their configurations or inner structures. Therefore, it will be obvious to anyone skilled in the art that the invention is applicable in a sufficiently wide range.

According to the optical micro-manipulation method of the invention, a specimen is microscopically manipulated without being mechanically touched, and hence it can be observed in a desired direction without being adversely affected due to mechanical touch. Further, the optical micro-manipulator of the invention can easily achieve more accurate micro-manipulation than a conventional mechanical micro-manipulator.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
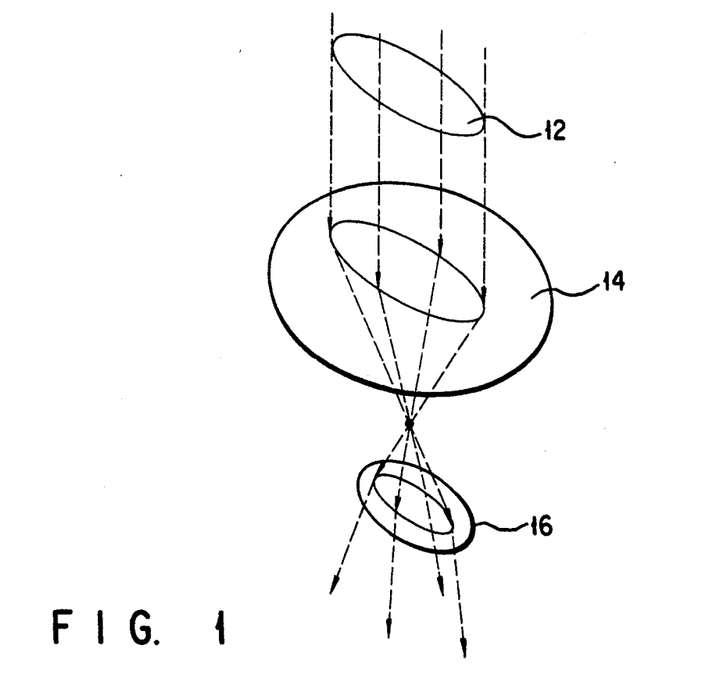
FIG. 1 is a view, showing a state in which a laser beam has detected a specimen by means of an optical micro-manipulation method according to a first embodiment of the invention.

FIG. 1 is a conceptional view, showing a first embodiment of the invention. A laser beam 12 emitted from a laser source (not shown) has a pattern 12a with a non-rotational symmetrical intensity distribution. The laser beam 12 is converged by an objective lens 14 with a high numerical aperture, to trap a microscopic specimen 16.

In this embodiment, the microscopic specimen 16 has a refractive index with a non-rotational symmetrical distribution hereinafter referred to "aeolotropic refractive index distribution"), whose configuration is, for example, a compressed one. The refractive index of the specimen 16 is higher than that of the circumferential elements.

Figure 2:
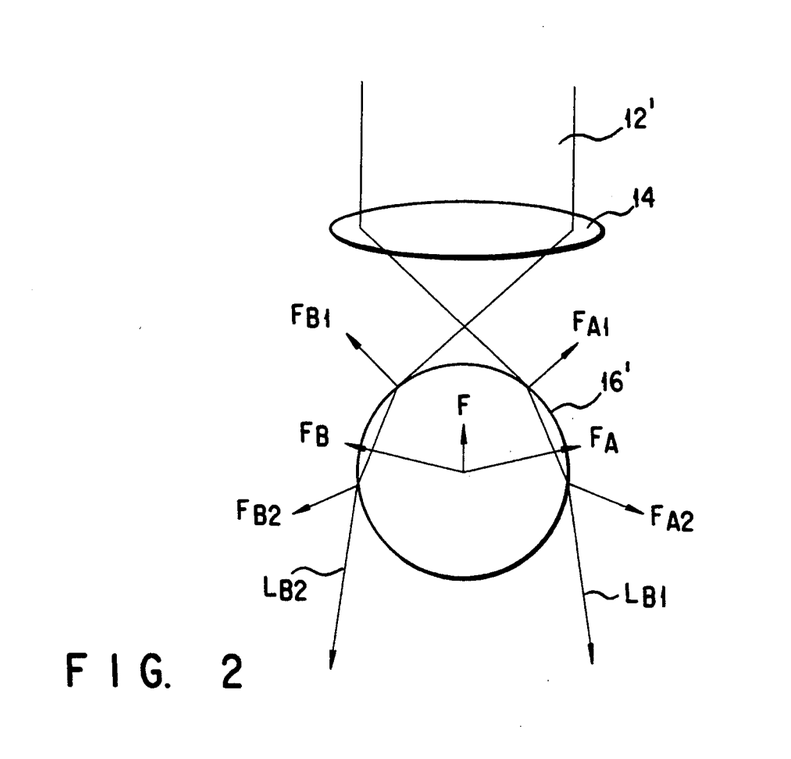
FIG. 2 is a view useful in explaining the principle of an optical trapping technique employed in the first embodiment, showing by vector notation various forces which act upon the specimen.

FIG. 2 is a view, useful in explaining the principle of optical trapping utilized in the embodiment of FIG. 1. In FIG. 2, to facilitate explanation, a laser beam 12' has a rotational symmetrical intensity distribution, and a microscopic specimen 16' has a rotational symmetrical distribution of refractive index (hereinafter referred to "isotropic refractive index distribution").

First, pay attention to a beam component $LB_1$ of the laser beam 12' which passes through a right portion of the specimen 16'. When this beam component has entered into the specimen 16', it is refracted at the surface of the specimen, and hence a force indicated by a vector $F_{A1}$ acts on the specimen surface. When the beam component has been emitted from the specimen 16', a force indicated by a vector $F_{A2}$ acts on the specimen surface.

Thus, the sum $(F_{A1}+F_{A2})$ of the forces indicated by the vectors $F_{A1}$ and $F_{A2}$ acts on the specimen 16'.

Similarly, when a beam component $LB_2$ has passed a left portion of the specimen 16', the sum $(F_{B1}+F_{B2})$ of forces indicated by vectors $F_{B1}$ and $F_{B2}$ acts on the specimen 16'.

Where the refractive index distribution of the specimen 16' is rotational symmetrical, and the intensity of the beam component $LB_1$ is equal to that of the beam component $LB_2$, the resultant force F of forces indicated by vectors $F_A$ and $F_B$ has no horizontal component and hence acts in the vertical direction. When such a force relationship is established in every plane parallel with the optical axis, the specimen 16' is raised upward by a resultant force due to optical pressure. Thus, the specimen 16' is caught in a state in which the resultant force and the gravity of the specimen are balanced.

Again referring to FIG. 1, explanation will be given of the specimen 16 having an aeolotropic refractive index distribution. When the laser beam 12 with the elliptical pattern 12a is converged onto the specimen 16, the specimen 16 is trapped, with the major axes of the pattern 12a and the specimen 12 aligned with each other. This is because the aeolotropic laser beam has a trapping force with aeolotropic properties so that the above-described trapping state is dynamically stable at the time of trapping a specimen with an aeolotropic refractive index distribution. In this state, rotating the major axis of the intensity distribution of the beam pattern 12a causes rotation of the specimen trapped, in other words, manipulates the specimen.

Microscopic examination of a specimen in a desired direction can be performed by arranging the optical axis of an objective lens (not shown), employed in the microscope, perpendicular to the axis of rotation of the intensity distribution of the beam 12.

Figure 3:
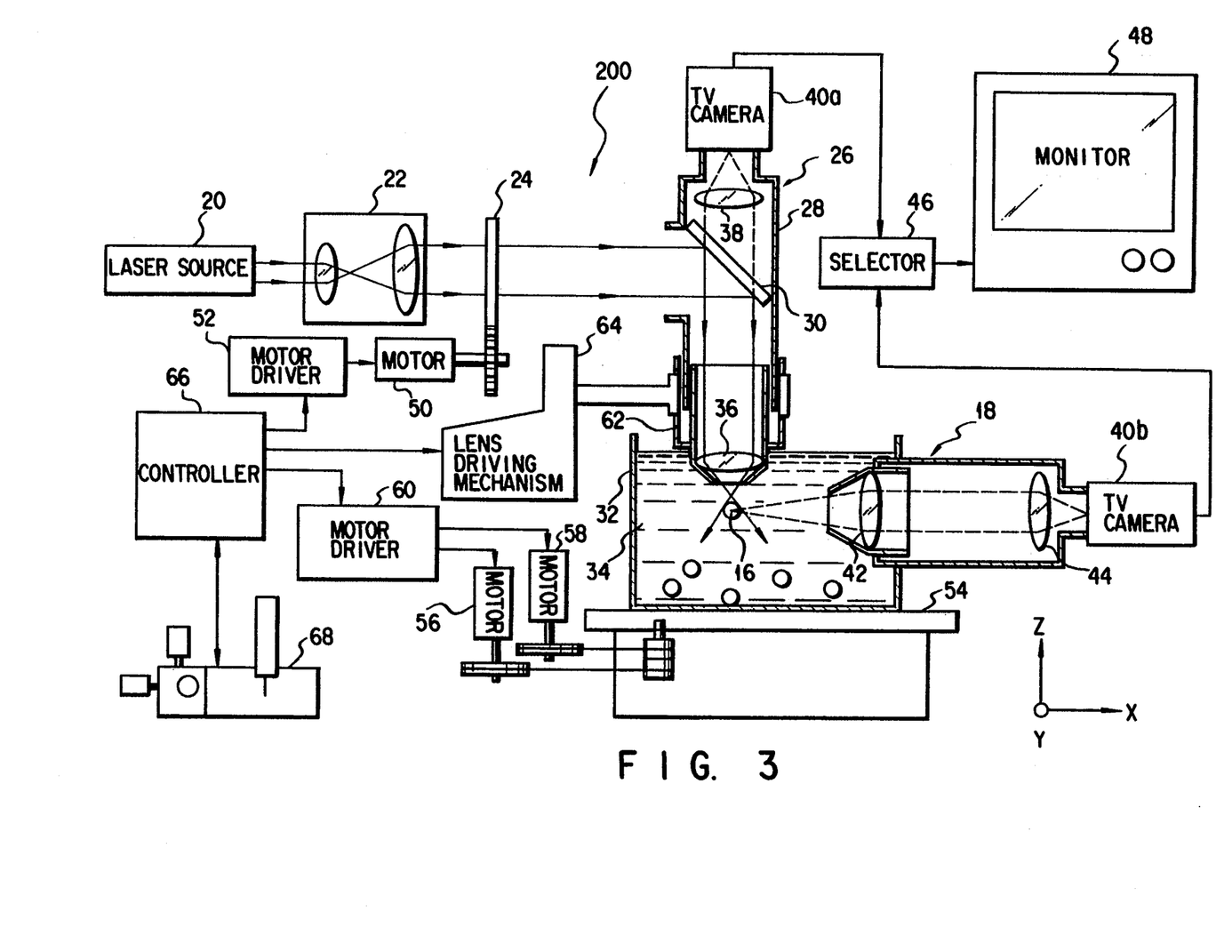
FIG. 3 is a diagram, showing the overall arrangement of an optical micro-manipulator according to a second embodiment of the invention.

FIG. 3 shows a second embodiment of the invention as a more specified embodiment for realizing the method of the invention. In this embodiment and the other embodiments which will be hereinafter explained, an "optical trapping microscope" means a microscopic optical system for micro-manipulating a microscopic specimen by optical trapping, whereas a "monitoring microscope" means a microscopic optical system for microscopically examining the specimen.

As is shown in FIG. 3, a micro-manipulator 200 is combined with a monitoring microscope 18.

A laser beam emitted from a laser source 20 passes through a rectangular filter 24 after it has its diameter increased by means of a beam expander 22, and enters into a mirror tube 28 in an optical trapping microscope 26. The laser beam then reflects from a half mirror 30, and enters into an objective lens 36 immersed in a liquid medium (a culture solution, a physiological saline solution, etc.) held in a container 32. The laser beam is converged by the lens 36 onto a microscopic specimen 16 floating in the liquid medium 34, such as a cell organelle. An optical image of the microscopic specimen 16 is formed by an image-forming lens 38 through the objective lens 36 and the half mirror 30, and is picked up by a television camera 40a.

The monitoring microscope 18 inserted in the tank from a side portion thereof has an objective lens 42 immersed in the liquid medium 34. The immersion objective lens 42 has its optical axis (X-axis) arranged perpendicular to the optical axis (Z-axis) of the immersion objective lens 36 of the optical trapping microscope 26.

An optical image of the specimen, formed by means of the objective lens 42 and an ocular lens 44 which are employed in the monitoring microscope 18, is picked up by means of a television camera 40b and then displayed on a monitor 48 via a selector 46. The selector 46 selectively switches images picked up by the television cameras 40a and 40b.

Figure 4:
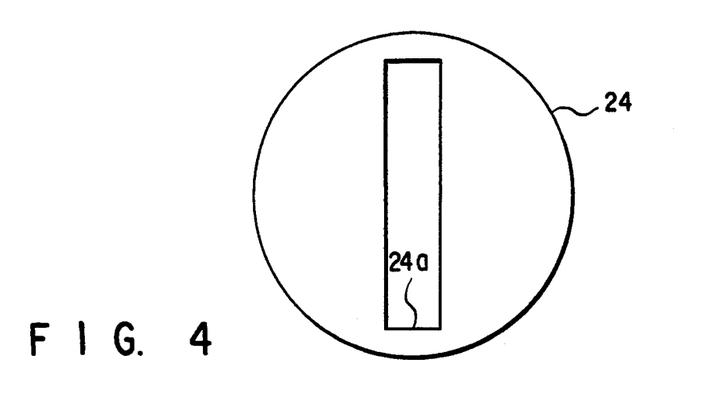
FIG. 4 is a plan view, showing a rectangular filter employed in the second embodiment, and taken in a direction in which the laser beam passes.

As is shown in FIG. 4, the rectangular filter 24 has an aperture 24a whose configuration is rectangular in a direction in which the laser beam passes, and serves to cause the laser beam to have a non-rotational symmetrical spatial form. More specifically, a laser beam of a usual oscillation mode (i.e., $TEM_{00}$ mode) has a rotational symmetrical Gaussian distribution. When the laser beam has passed through the rectangular filter 24, it loses its spatial rotational symmetrical distribution and gains a linear distribution.

Referring again to FIG. 3, the rectangular filter 24 is rotated about the optical axis of the laser beam by means of a motor 50 controlled by a motor driver 52.

The micro-manipulator 200 has preferably a mechanical stage 54 which supports the container 32. The mechanical stage 54 can be moved in the directions of the X- and Y-axes by means of an X-axis motor 56 and a Y-axis motor 58 controlled by a motor driver 60. The stage 54 may be modified such that it can be moved in the direction of the Z-axis, too. This modification can be easily achieved by anyone skilled in the art.

It is preferable that the Z-axis directional distance between the objective lens 36 of the optical trapping microscope 26 and the stage 54 is movable. To this end, the micro-manipulator 200 has a lens driving mechanism 64 for driving in the direction of the Z-axis a lens holder 62 supporting the objective lens 36.

The motor driver 52 and 60 and the lens driving mechanism 64 are controlled by instruction signals from a controller 66.

A control box 68 connected to the controller 66 has manually-operated elements, such as a joystick and a lever, for manually supplying the controller 66 with instruction signals for performing optical micro-manipulation.

The steps of manipulation performed in the micro-manipulator 200 according to the second embodiment are as follows:

I) The selector 46 selects an image signal from the television camera 40a to display on a monitor 48 an image picked by the optical trapping microscope 26;

II) The specimen 16 is searched in the container 32 by moving the stage 54 and the objective lens 36 of the optical trapping microscope 26 while observing the monitor 48;

III) When an image of the specimen 16 is positioned at the center of the screen of the monitor 48, the laser beam is emitted to trap the specimen 16;

IV) The stage 54 and the objective lens 36 of the optical trapping microscope 26 are moved with the specimen trapped, so as to position the specimen 16 to the focal surface of the objective lens 42 of the monitoring microscope 18;

V) The selector 46 selects an image signal from the television camera 40b and displays on the monitor 48 an image picked by the monitoring microscope 18; and VI) In order to adjust the angular position of the specimen 16, the specimen is rotated by changing the direction in which the rectangular filter 24 faces, while the state obtained in the step V) is kept.

Effecting the above-described steps enables the monitor 48 to display that image of the specimen 16 which is viewed in a direction in which the rectangular filter 24 is controlled to face. In other words, the specimen 16 can be microscopically examined in a desired direction simply by rotating the rectangular filter 24.

Figure 5:
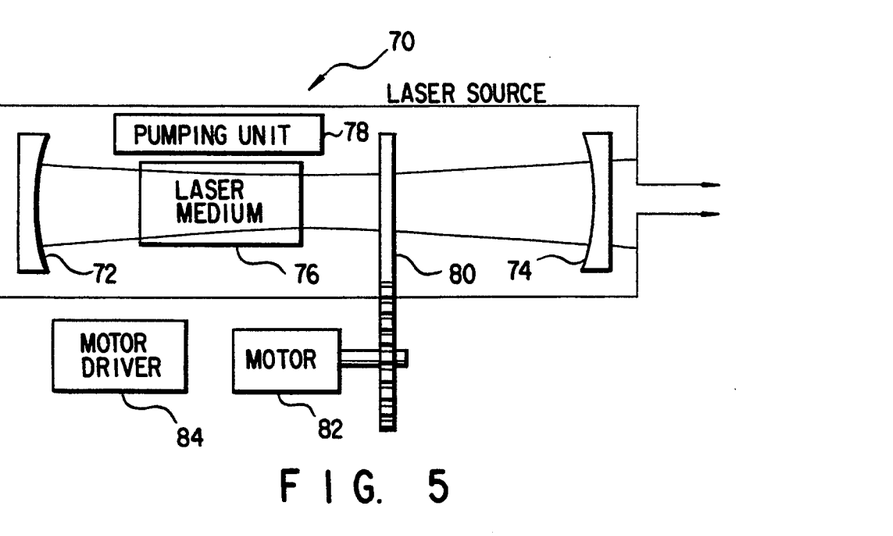
FIG. 5 is a diagram, showing a laser source employed in a third embodiment of the invention.

FIG. 5 shows a third embodiment of the invention. This embodiment differs in two points from the above-described second embodiment (shown in FIGS. 3 and 4). First, in this embodiment, a non-rotational symmetrical spatial intensity distribution of the laser beam is realized by the use of a laser source 70 for emitting a laser with high-order transverse-mode oscillation, in place of the laser source 20 employed in the second embodiment. Second, none of the rectangular filter 24 and its driving units 50 and 52 is employed in this embodiment. The other component parts are similar to those employed in the second embodiment, and hence no explanation and illustration are given of them.

As is shown in FIG. 5, the laser source 70 basically comprises a pair of resonant mirrors 72 and 74 which serve as a Fabry-Pérot resonator, a laser medium containing a solid body and a gas which perform stimulated-emission of light when they have received energy, and a pumping unit 78 for supplying the laser medium 76 with energy such as light or an electric field.

Further, there is provided between the resonant mirrors 72 and 74 a rotary member 80 with a rectangular aperture (not shown) similar to the rectangular aperture 24a of the rectangular filter 24 (FIG. 4). The center of the rectangular aperture is aligned with the optical axis of the laser beam. The rotary member 80 is rotated about the optical axis of the laser beam by means of a motor 82 driven by a motor driver 84. As The motor driver 84 is controlled by the controller 66 on the basis of an instruction from the control box 68, as in the case of the motor driver 52 in the second embodiment (FIG. 3).

Although almost all general laser sources are designed to emit a laser beam of 0-th order transverse-mode oscillation ($TEM_{00}$), the laser source 70 in this embodiment can emit a beam of high-order transverse-mode oscillation ($TEM_{10}$, $TEM_{20}$, etc.) by virtue of the rectangular aperture formed in the resonator.

Figure 6:
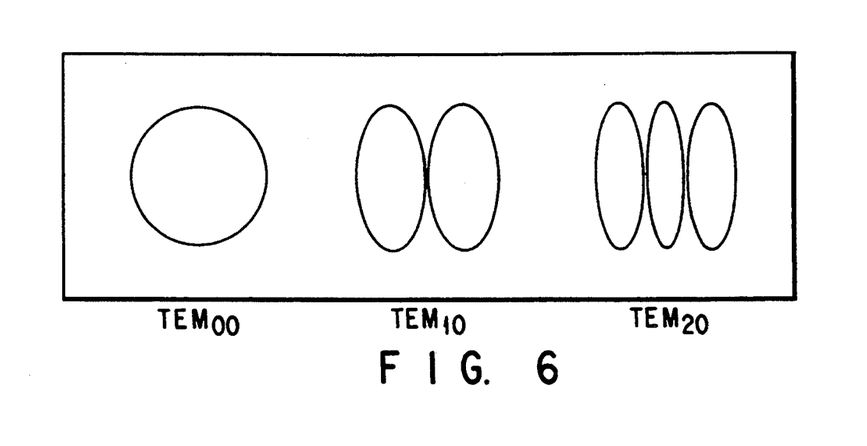
FIG. 6 is a conceptional view, showing spatial intensity distributions of transverse modes ($TEM_{00}$, $TEM_{10}$, $TEM_{20}$)

As is evident from FIG. 6, $TEM_{00}$ has a rotational symmetrical Gaussian distribution, whereas $TEM_{10}$ or $TEM_{20}$ has a non-rotational symmetrical distribution.

As in the case of the second embodiment, the laser beam emitted from the laser source 70 has its diameter increased by means of the beam expander 22 (FIG. 3), and then enters into the optical trapping microscope 26.

The observer can microscopically examine any desired portion of the specimen 16 by rotating the rotary member 80 with the rectangular aperture, as in the case of the rectangular filter 24 in the second embodiment.

The above third embodiment is advantageous in that the power of the laser beam can be effectively extracted as a result of utilizing the non-rotation-symmetry of the beam, in addition to the advantage that the structure for rotating the specimen 16 is relatively simple, as in the second embodiment.

Figure 7:
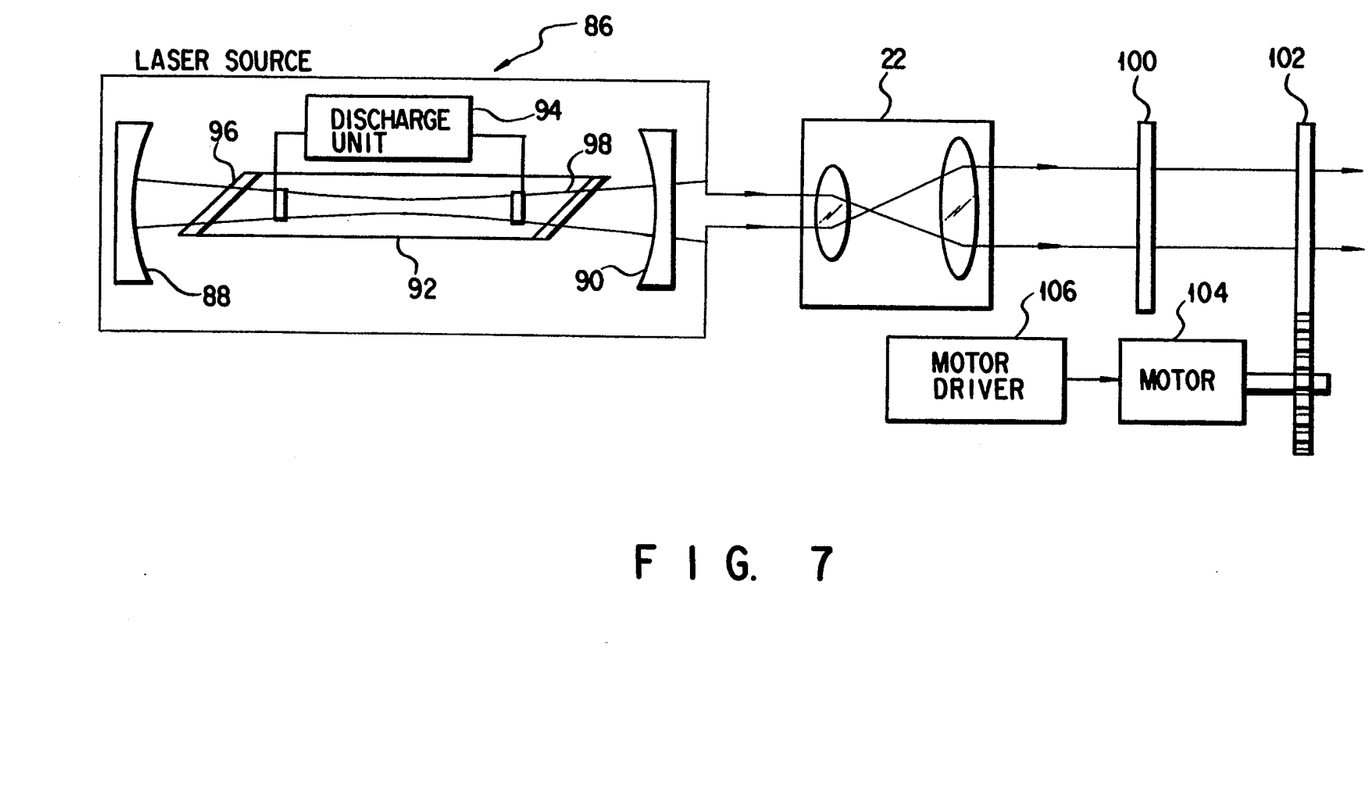
FIG. 7 is a diagram, showing a laser source employed in a fourth embodiment of the invention.

FIG. 7 shows a fourth embodiment of the invention. This embodiment differs in two points from the above-described second embodiment (shown in FIGS. 3 and 4). First, in this embodiment, a laser source 86 for emitting a linearly-polarized laser beam is employed in place of the laser source 20 employed in the second embodiment. In general, the reflectance of light on the boundary surface of materials is determined depending on a polarization component contained in the materials. Thus, application of a linearly-polarized laser beam to a microscopic specimen enables the spatial distribution of light pressure to have aeolotropic properties. Second, first and second ¼ wave plates 100 and 102 are employed in place of the rotatable rectangular filter 24. The other component parts are similar to those employed in the second embodiment, and hence no explanation and illustration are given of them.

As is shown in FIG. 7, the gas laser source 86 basically comprises resonant mirrors 88 and 90, a discharge tube 92 which seals therein a gas, such as Ar+, He—Ne, or Kr+, and performs stimulated-emission of light, a discharge unit 94 for supplying the tube 92 with a power to cause it to perform discharge, and Brewster angled windows 96 and 98 provided on the both opposite ends of the tube 92 for reducing reflection losses in the resonant mirrors 88 and 90.

The Brewster angled windows 96 and 98 are designed such that a laser beam having passed through the discharge tube 92 can enter into them at a predetermined angle (an angle of polarization), and hence can oscillate only a polarized component (p-component) which will cause no reflection loss when it has reciprocated within the resonator. This is an application of the fact, to the apparatus, that when light has entered into a dielectric member such as glass at a polarization angle, only a polarized component perpendicular to the surface of incidence (s-component) is reflected, and a polarized component parallel with the incidence surface (p-component) is not reflected.

Thus, the gas laser source 86 emits a linearly-polarized laser beam. This beam has its diameter increased by means of the beam expander 22, as in the second embodiment. Thereafter, the laser beam passes through the first ¼ wave plate 100, where it is converted into a circularly-polarized beam. The circularly-polarized beam passes through the second ¼ wave plate 102, where it is again converted into a linearly-polarized beam. The second ¼ wave plate 102 is rotated by means of a motor 104 driven by a motor driver 106. The motor driver 106 is controlled by the controller 66 on the basis of an instruction from the operation unit 68, as in the case of the motor driver 52 of the second embodiment (FIG. 3).

In accordance with rotation of the second ¼ wave plate 102, a laser beam which has a linearly-polarized component in a desired direction is guided to the optical trapping microscope. In summary, the spatial dynamic properties of trapping light become non-rotation-symmetrical by converting the trapping light into linearly-polarized light.

The observer can observe a desired portion of the microscopic specimen 16 by rotating the second ¼ wave plate 102, as in the rectangular filter 24 of the second embodiment.

The third embodiment is advantageous in that it is applicable also to a specimen which has a polarization component different from that of the specimen 16, and hence has optical properties (such as a refractive index) different from the same, as well as in that the structure for rotating the specimen 16 is relatively simple.

Alternatively, the first and second ¼ wave plates 100 and 102 may be replaced with a single ½ wave plate (not shown) rotated by the motor 104.

Moreover, the laser source 86 is not limited to a gas laser source, but may consist of a solid laser source. The solid laser source, too, can emit a linearly-polarized laser beam.

Figure 8:
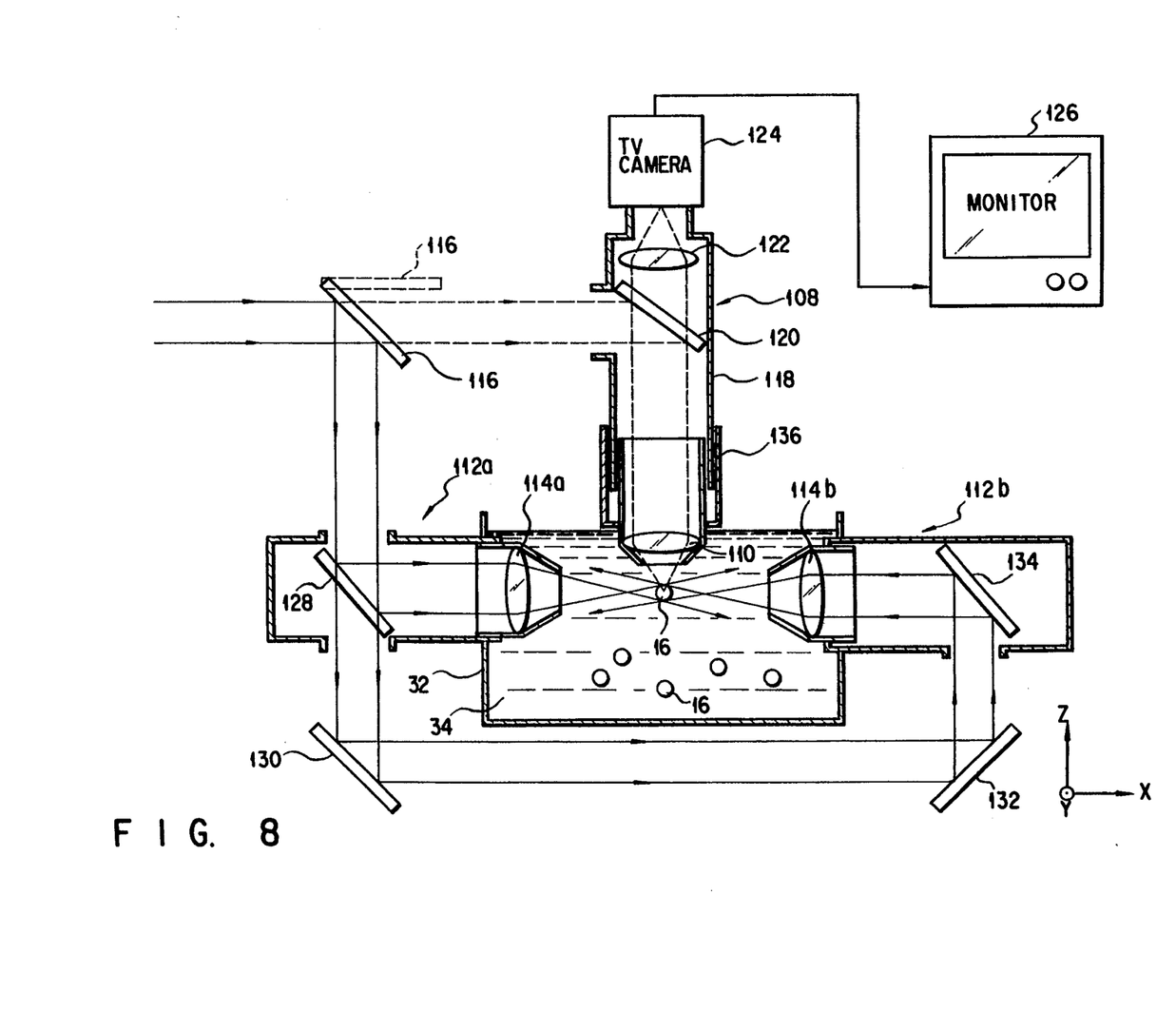
FIG. 8 is a view, showing the relationship between a microscope for observation and two microscopes for optical trapping, which are employed in an optical micro-manipulator according to a fifth embodiment.

FIG. 8 shows a fifth embodiment of the invention. This embodiment is mainly directed to the arrangement and structure of the monitoring microscope ant the optical trapping microscope. The other component parts are similar to those employed in the second through fourth embodiments, and therefore no explanation will be given of them.

A monitoring microscope 108 inserted in the tank 32 from above has an objective lens 110 immersed in the liquid medium 34. The optical axis of the immersion objective lens 110 extends substantially in the vertical (Z-axis) direction.

Two optical trapping microscopes 112a and 112b are inserted in the tank 32, opposed to each other in the horizontal direction (X-axis direction). These microscopes have objective lenses 114a and 114b immersed an the liquid medium, respectively. The optical axes of the immersion objective lenses 114a and 114b are substantially aligned with each other in the horizontal direction (X-axis direction).

A laser beam emitted from a light source (not shown) is selectively guided, by means of a detachable mirror 116, into the monitoring microscope 108 and the optical trapping microscope 112.

When the mirror 116 is put out of the path of the laser beam as indicated by the imaginary line, the laser beam enters into the objective lens 110 via a half mirror 120 located in a mirror tube 118 in the monitoring microscope 108. This laser beam is used as trapping light for selectively trapping a specimen 16 to be microscopically examined.

An ocular lens 122 is provided in the mirror tube 118 above the half mirror 120. An optical image of the specimen 16 formed by the objective lens 110 and ocular lens 122 is picked by a television camera 124 located on the upper end of the mirror tube 118. A microscopic image formed by the television camera 124 is displayed on a monitor television 126.

On the other hand, when the mirror 116 is set across the path of the laser beam as indicated by the solid line, the laser beam enters into the two optical trapping microscopes 112a and 112b. More specifically, a beam of an intensity one-half of the laser beam is guided into the objective lens 114a by means of the half mirror 128, and a beam of the other-half intensity is guided into the objective lens 114b by means of mirrors 130, 132 and 134.

The objective lenses 114a and 114b are made of the same optical material. Further, the numerical aperture of the lenses 114a and 114b is lower than that of the objective lens 110, and the optical pressure of beams having passed through the lenses works as a force urging the microscopic specimen 16. Since the lenses 114a and 114b with a low numerical aperture have a major working distance, they can trap the specimen 16 in positions relatively remote therefrom. Accordingly, the objective lens 110 of the monitoring microscope 108 can be located closer to the specimen 16.

The microscopic specimen 16 is trapped in a position in which the horizontal forces of the two laser beams guided through the objective lenses 114a and 114b of the two optical trapping microscopes balance with each other, and at the same time the vertical forces of the two laser beams balance with the gravity of the specimen 16.

A lens holder 136 holding the objective lens 110 of the monitoring microscope 108 can be moved in the direction of the Z-axis by the lens driving mechanism 66 (not shown in FIG. 8), as in the case of the holder 62 employed in the second embodiment (FIG. 3) for holding the objective lens 36 of the optical trapping microscope.

Manipulation steps in the fifth embodiment are as follows:

I) The detachable mirror 116 is beforehand put out of the path of a laser beam;

II) An image supplied from the monitoring microscope 108 is displayed on the monitor 126;

III) The specimen 16 is searched in the container 32 by moving the stage 54 (not shown in FIG. 8) and the objective lens 110 of the microscope 108 while observing the screen of the monitor 126;

IV) When the specimen 16 is positioned at the center of the screen of the monitor 126, the laser beam is emitted thereon to trap the sample;

V) The trapped specimen 16 is moved by means of the laser beam to a position in which the specimen can be trapped by the use of the objective lenses 114a and 114b of the two optical trapping microscopes;

VI) The detachable mirror 116 is set across the path of the laser beam to trap the specimen 16 by beams converged by the objective lenses 114a and 114b; and VII) The specimen 16 is rotated by controlling the spatial properties of the laser beam with the use of the method employed in any of the second through fourth embodiments, so as to adjust the angular position of the sample.

Thus, the monitor 126 displays the image of the specimen 16 which is viewed in a desired direction, as a result of control of the spatial properties of the laser beam.

This embodiment can employ a monitoring objective lens 110 with a higher numerical aperture and a higher power than those in the second through fourth embodiments, and hence a microscopic image of a higher power and a higher resolution can be observed in a desired direction.

Figure 9:
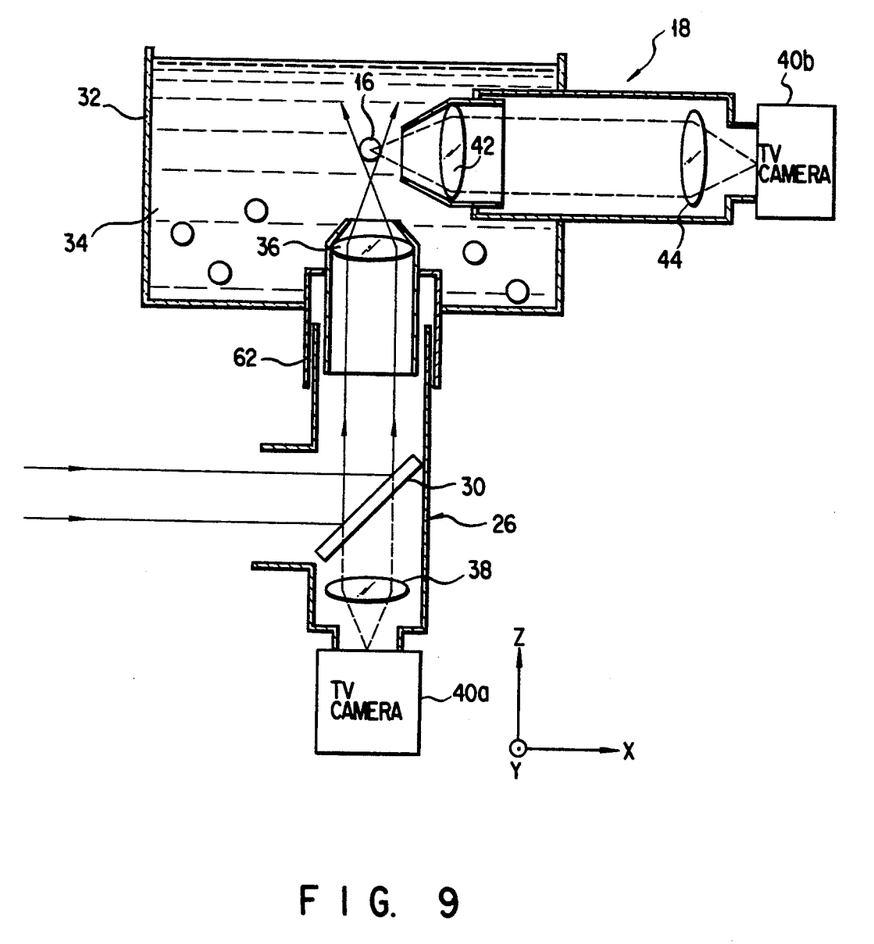
FIG. 9 is a view, showing the relationship between a microscope for observation and a single microscope for optical trapping, which are employed in an optical micro-manipulator according to a sixth embodiment.

FIG. 9 shows a sixth embodiment of the invention. This embodiment differs in two points from the second embodiment. First, the location of the optical trapping microscope 26 differs between the embodiments. In this embodiment, the microscope 26 is inserted in the container 34 from below. Thus, the optical axis of the objective lens 36 of the microscope 26 extends substantially in the vertical (Z-axis) direction.

Second, as in the fifth embodiment, the objective lens 36 of the optical trapping microscope 26 has a relatively low numerical aperture, and the objective lens 42 of the monitoring microscope 18 has a relatively high numerical aperture. The other component parts are similar to those employed in the second through fourth embodiments, and therefore no explanation will be given of them.

The optical pressure of a beam having passed through the objective lens 36 with a low numerical aperture works as a force urging the microscopic specimen 16, as in the fifth embodiment. Thus, the specimen 16 is pushed upward by the laser beam, and trapped in a position in which the upward force balances with the gravity of the specimen.

In the sixth embodiment, the specimen 16 can be microscopically examined in a desired direction by effecting the same manipulation process as employed in the second embodiment. Further, a microscopic image of a high power and a high resolution can be displayed, as in the fifth embodiment. In addition, the apparatus of the sixth embodiment has a more simple structure than the fifth embodiment.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method for optically micro-manipulating a specimen immersed in a liquid, comprising the steps of:
generating a laser beam having a non-rotational symmetrical spatial property distribution;
converging the laser beam onto the immersed specimen to trap it;
controlling the spatial property distribution of the laser beam by rotating the laser beam; and
microscopically observing the specimen by means of a microscope.

2. The method according to claim 1, further comprising the steps of observing the specimen by the use of an optical system for radiating the laser beam onto the immersed specimen, and positioning the laser beam to the laser beam is emitted onto the specimen to trap it.

3. An apparatus for optically micro-manipulating a specimen to be microscopically examined by means of a microscope, comprising:
means for generating a laser beam having a non-rotational symmetrical spatial property distribution;
means for converging the laser beam onto the specimen to trap it; and
means for rotating the laser beam about an optical axis thereof to control the spatial property distribution thereof.

4. The apparatus according to claim 3, wherein
the laser beam generating means has a light source; means for converting a light beam, emitted from the light source, into a parallel light beam; and a filter located across the parallel light and having a non-rotational symmetrical aperture; and
the rotating means rotates the filter about the optical axis of the parallel light beam.

5. The apparatus according to claim 4, wherein the non-rotational symmetrical aperture is a rectangular aperture.

6. The apparatus according to claim 3, wherein
the laser beam generating means has a laser source provided with a Fabry-Pérot resonator; and a filter located in the resonator and having a non-rotational symmetrical aperture; and
the rotating means rotates the filter about the optical axis of a light beam passing in the resonator.

7. The apparatus according to claim 6, wherein the non-rotational symmetrical aperture is a rectangular aperture.

8. The apparatus according to claim 3, wherein the laser beam generating means has a laser source for emitting a linearly-polarized light beam.

9. The apparatus according to claim 8, wherein the rotating means has two $\lambda/4$ wave plates located across the light beam emitted from the laser source, and rotates about the axis of the light beam that one of the $\lambda/4$ wave plates which is located downstream of the other one in the direction of the light beam.

10. The apparatus according to claim 8, wherein the rotating means has a λ/2 wave plate located across the light beam emitted from the laser source, and rotates the λ/2 wave plate about the axis of the light beam.

11. An apparatus for optically micro-manipulating a specimen immersed in a liquid while microscopically observing the specimen, comprising:
   a container containing the liquid in which the specimen is immersed;
   means for microscopically observing the specimen;
   means for generating a laser beam having a non-rotational symmetrical spatial property distribution;
   means for converging the laser beam onto the specimen to trap it; and
   means for rotating the laser beam to control the spatial property distribution thereof.

12. The apparatus according to claim 11, wherein the converging means emits the laser beam into the container in a horizontal direction, and the microscopical observation means permits the specimen to be observed from above the container.

13. The apparatus according to claim 12, wherein the converging means converges two laser beams irradiated in opposite directions to each other, on the specimen.

14. The apparatus according to claim 11, further comprising:
   first image pick-up means for picking up an optical image of the specimen formed by the converging means;
   second image pick-up means for picking up an optical image from the microscopic observation means; and
   means for selectively displaying the optical images picked by the first and second image pick-up means.

15. The apparatus according to claim 11, wherein the converging means emits the laser beam from under the container, and the microscopic observation means permits the specimen to be observed in a horizontal direction for the container.

16. The apparatus according to claim 11, further comprising means for moving the container along a direction of the optical axis of the microscopic observation means.

17. The apparatus according to claim 11, further comprising means for moving the container along a direction of the optical axis of the converging means.

* * * * *